(12) United States Patent
Amin et al.

(10) Patent No.: US 8,769,075 B2
(45) Date of Patent: Jul. 1, 2014

(54) USE OF A SYSTEMS MANAGEMENT TOOL TO MANAGE AN INTEGRATED SOLUTION APPLIANCE

(75) Inventors: Sandip Amin, Austin, TX (US); Rishika Kedia, Bangalore (IN); Anbazhagan Mani, Bangalore (IN); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/353,189

(22) Filed: Jan. 18, 2012

(65) Prior Publication Data

US 2013/0185405 A1 Jul. 18, 2013

(51) Int. Cl.
*G06F 15/173* (2006.01)

(52) U.S. Cl.
USPC .......................................................... 709/223

(58) Field of Classification Search
None
See application file for complete search history.

(56) References Cited

U.S. PATENT DOCUMENTS

| | | | |
|---|---|---|---|
| 6,345,294 B1 | 2/2002 | O'Toole et al. | |
| 6,687,835 B1* | 2/2004 | Hirano et al. | 726/4 |
| 7,293,195 B1 | 11/2007 | Watanabe et al. | |
| 8,019,839 B2* | 9/2011 | Lopes | 709/221 |
| 8,028,329 B2* | 9/2011 | Whitcomb | 726/5 |
| 8,353,048 B1* | 1/2013 | Werner et al. | 726/27 |
| 2006/0248047 A1 | 11/2006 | Grier et al. | |
| 2009/0044024 A1* | 2/2009 | Oberheide et al. | 713/188 |
| 2009/0182945 A1 | 7/2009 | Aviles et al. | |
| 2009/0222812 A1 | 9/2009 | Nissen et al. | |
| 2012/0011505 A1* | 1/2012 | Fujisaki et al. | 718/1 |
| 2012/0079424 A1* | 3/2012 | Rogers et al. | 715/810 |
| 2012/0102023 A1* | 4/2012 | Osman et al. | 707/722 |
| 2012/0131180 A1* | 5/2012 | Nomura et al. | 709/224 |
| 2013/0103837 A1* | 4/2013 | Krueger | 709/226 |

* cited by examiner

*Primary Examiner* — Oscar Louie
*Assistant Examiner* — Younes Naji
(74) *Attorney, Agent, or Firm* — Yee & Associates, P.C.; David A. Mims, Jr.

(57) ABSTRACT

An embodiment of the invention comprises a method for use with an integrated solution appliance under control of a management tool, the appliance having at least a console and a plurality of servers. The method includes providing the management tool with a CAM configured to participate in managing the appliance when used to implement a deployed solution. The CAM is furnished with a CTM for use in acquiring appliance level information, which includes specified metadata pertaining to each server. The CAM is also furnished with a COM, wherein the COM is operable to interact with components of the management tool, and is further operable to use information acquired by the CTM to selectively modify one or more commands issued by the management tool, which respectively affect operation of the appliance.

20 Claims, 4 Drawing Sheets

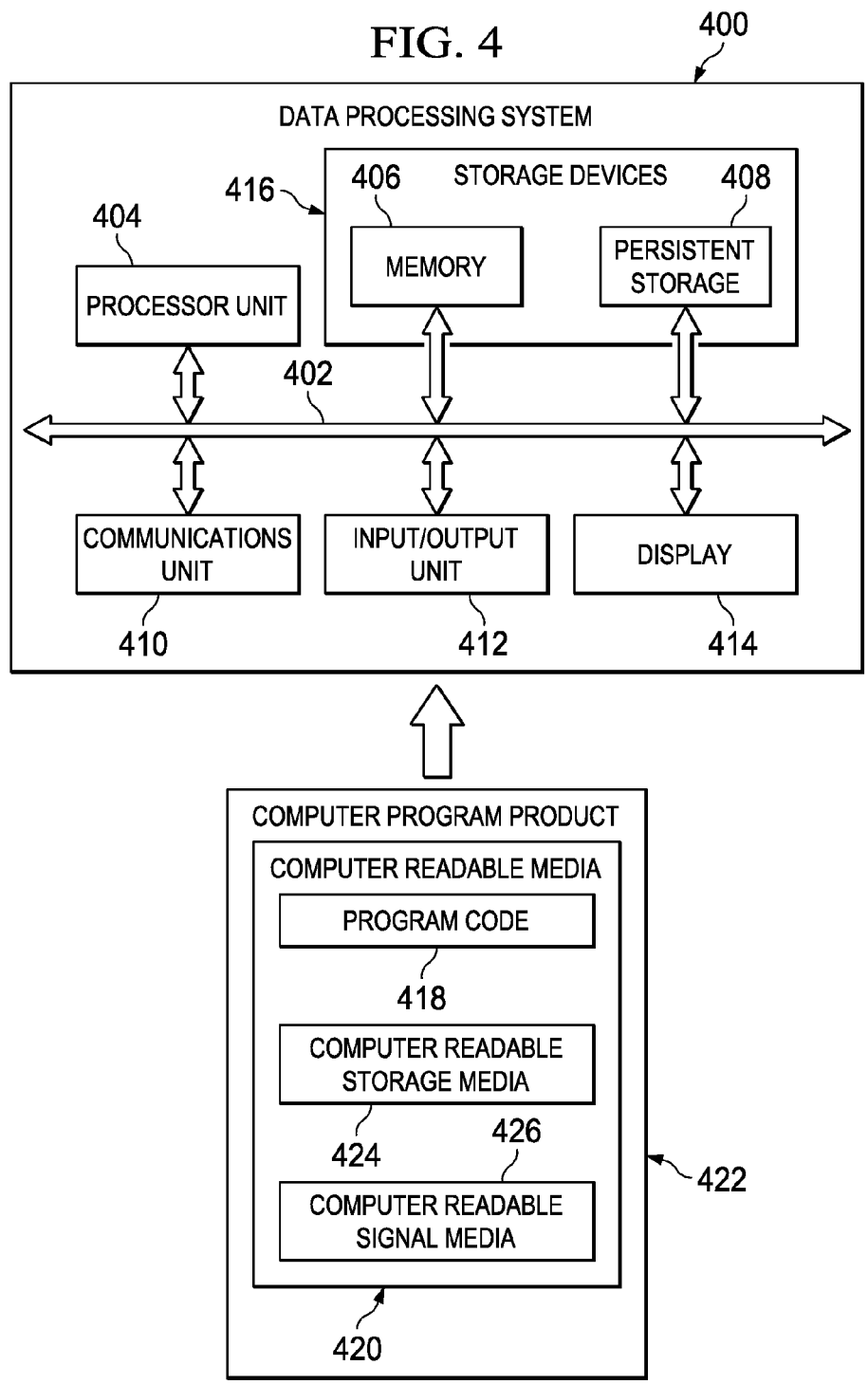

USE OF A SYSTEMS MANAGEMENT TOOL TO MANAGE AN INTEGRATED SOLUTION APPLIANCE

BACKGROUND

1. Field

The invention disclosed and claimed herein pertains to a method and apparatus for using a systems management tool, entity, or product of some type to manage a computer appliance. More particularly, the invention pertains to a method and apparatus of the above type, wherein the appliance comprises an integrated solution appliance.

2. Description of the Related Art

In a large data center, a systems management tool, such as Systems Director of the IBM Corporation, is commonly used to manage multiple solutions. As is known by those of skill in the art, a systems management tool, product, or other entity is an administrator of distributed computer systems and can extend across an entire enterprise. As used herein, the term "solution" means or refers to a computer system wherein a number of computer hardware, software, and middleware components are configured to interact with one another in order to perform a specified function or task, or to achieve a specified objective.

A systems management tool, product, or entity may also be used to manage or control a solution that resides in or is associated with a computer appliance. As is known by those of skill in the art, an appliance is a hardware device with integrated software and/or firmware, which is designed to provide a specific computing resource. As used herein, the term "integrated solution appliance" means an appliance that can be used to implement multiple solutions, wherein different solutions need to share the same hardware and software components of the appliance. Usefully, an integrated solution appliance includes middleware for running and integrating the software components of solutions that are respectively associated with the appliance.

An integrated solution appliance can contain multiple servers, switches, and storage elements. Also, each solution can have its own management mechanism and console. As a result, if a presently available systems management tool is used to manage an integrated solution appliance as a single abstracted resource, efficiency of the management effort may be quite limited. This is because the existing solution, which has specific targeted management consoles for individual appliance solutions, is not scalable to the different solutions of the appliance. Also, such arrangement requires training system administrators on multiple management methodologies and consoles. However, by not making use of a systems management capability, the total cost of ownership, as well as the cost for additional services, can be significantly increased.

SUMMARY

Embodiments of the invention provide a method, apparatus, and computer program product, wherein a systems management tool, product, or other entity, which is also referred to herein as a management tool for convenience, is used in the management of an integrated solution appliance as described above, embodiments enable solution level handling of resources for control operations like starting and stopping, and for performing configuration and maintenance (update) operations. Thus, embodiments of the invention provide an ability to manage solutions deployed on hardware resources by being solution aware. That is, the solution management is adapted to comply with all requirements specified for each different solution.

One embodiment comprises a method for use with an appliance that is under the control of a management tool, wherein the appliance comprises an integrated solution appliance having resources that include at least a console and a plurality of servers. The method comprises the step of providing the management tool with a cluster appliance manager (CAM), which is configured to participate in managing the appliance when the appliance is used to implement a solution deployed thereon. The method further comprises furnishing the CAM with a cluster topology manager (CTM) for use in acquiring appliance level information, wherein the acquired information includes specified metadata pertaining to each server of the plurality. The method further includes furnishing the CAM with a cluster operations manager (COM), wherein the COM is operable to interact with components of the management tool, and is further operable to use information acquired by the CTM to selectively modify one or more commands issued by the management tool, which respectively affect operation of the appliance.

BRIEF DESCRIPTION OF THE SEVERAL VIEWS OF THE DRAWINGS

FIG. 4 is a block diagram showing a data processing system that may be used as one or more of the components of an embodiment of the invention.

DETAILED DESCRIPTION

Computer Program Product Claim Support

Figure 1:
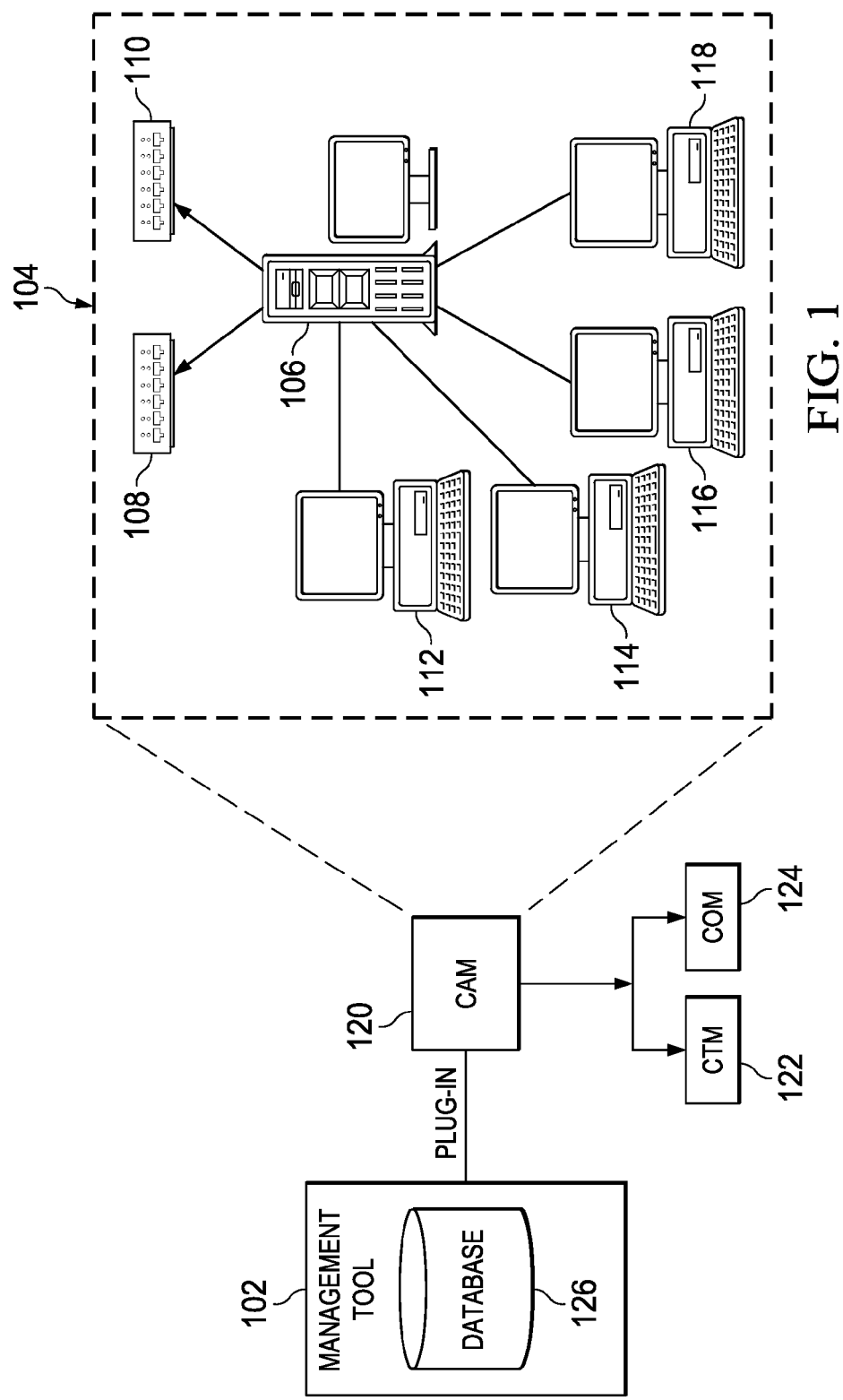
FIG. 1 is a schematic diagram depicting components of an embodiment of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Referring to FIG. 1, there are shown components for an embodiment of the invention. FIG. 1 shows a management tool 102, which comprises a particular systems management tool or entity as described above. Management tool 102 may comprise a systems management product such as IBM Systems Director, but the invention is not limited thereto. A systems management product, such as management tool 102, has the capability to manage both individual and a collection of hardware resources, such as servers, switches, and storage components.

FIG. 1 further shows an integrated solution appliance 104, which is connected to be managed or directed by management tool 102. Systems manager 102 controls integrated solution appliance 104 by sending commands or other control signals thereto. Integrated solution appliance 104 comprises a device as described above, which includes hardware, software, firmware, and middleware components, and different solutions may be implemented on the appliance by sharing the same hardware and software components. Middleware, which is used to build and integrate the software components of respective solutions, could include, by way of example, WebSphere, DB 2, or IT CAM. However, embodiments of the invention are not limited thereto. Integrated solution appliance 104 is exemplified by the Smart Analytic Systems product of IBM, but embodiments of the invention are again not limited thereto.

FIG. 1 shows that integrated solution appliance 104 is provided with a control console 106, and is further provided with a number of hardware and software components, exemplified by components 108-118. Components 108-118 are controlled through control console 106, and include multiple servers such as servers 112-118. Components 108-118 also include other hardware resources, exemplified by switch 108 and storage component 110. Different combinations of components residing on integrated solution appliance 104, including components 108-116, will be used in implementing different solutions by means of integrated solution appliance 104.

In managing the servers that belong to a particular solution that is to be carried out on integrated solution appliance 104, it is required to follow a set of solution specific rules for control, configuration, and management. As an example, in one embodiment of the invention using integrated solution appliance 104, servers are grouped as various modules, wherein a module runs on one or more physical servers. Each module is designed to perform a well-defined functionality. For example, Data Module is provided to perform data warehousing. The hardware elements such as storage area network (SAN) switches, network switches, and storage components are shared across respective modules. In order to start the server belonging to the Data Module, storage components and switches should be powered on. However, there are other dependent modules, such as Admin Module, that need to be started before the Data Module is started. Generally, there will be a start order that needs to be followed, in order to start a complex solution to ensure that all hardware and software dependencies are met.

As a further example of specific rules that must be followed, configuration in a solution appliance needs to be done at the appliance level. For example, deleting a particular user on a particular server may not be allowed, because other servers are configured to use the particular user on the particular server. Another critical scenario is handling updates, or performing periodic maintenance (updates) of the software and firmware stack. When handling updates for the entire appliance solution, it is required to update the hardware and firmware elements in a particular order, to meet dependencies, reduce downtime, and ensure correctness of the updates. Thus, it is required to have an efficient solution that can be followed by a systems management tool, in managing an integrated solution appliance.

In furtherance of this objective, FIG. 1 shows a cluster appliance manager (CAM) plug-in 120, which is added to management tool 102 for use in implementing embodiments of the invention. CAM 120 is provided to manage a solution carried out by means of integrated solution appliance 104, and more specifically to manage metadata and operations for the solution at the appliance level. FIG. 1 shows CAM 120 including a cluster topology manager (CTM) 122, and a cluster operations manager (COM) 124.

For a given solution, CAM 120 will be initialized with base information on the appliance, solution version, start order, stop order and update order metadata. During solution deployment, the appliance servers are pre-loaded with solution level metadata, such as metadata pertaining to topology and solution methodology control. The metadata is distributed to allow for easy expansion of the solution, and each server that is part of the solution is loaded with the metadata that is part of the overall solution. After the metadata has been distributed, CAM 120 is able to query agents that are running on the appliance servers and other resources, using a standard Common Information Model (CIM) protocol. This task is more particularly carried out by CTM 122 of CAM 120, as described hereinafter in further detail. Performing such task results in agents retrieving solution level appliance metadata information on a per-server basis. The metadata information is then delivered to CAM 120.

Each control operation, such as start or stop, each update operation, and/or each configuration operation will thus be performed in accordance with appliance level information that is located on the CAM 120 plug-in, in combination with information contained in the database 126 of management tool 102. Commands of management tool 102 are thus enhanced, by being able to use CAM 120 as an option, to perform appliance solution level operations such as appliance stop or appliance update operations. Moreover, management metadata is enhanced with additional objects using the CIM standard, which is an open standard that defines how managed elements in an IT environment are represented as a common set of objects and relationships between them. This is intended to allow consistent management of these managed elements, independent of their manufacturer or provider.

In order to handle appliance specific information, two CIM objects are added to the data model. These include an Appliance Managed Endpoint, which holds endpoint information for each of the hardware resources of the appliance, such as servers 112-118, switch component 108 and storage component 110.

The other added CIM object is an Appliance System, which holds information about the overall configuration and functioning of the integrated solution appliance 104. Such information includes the following:

Module Information (Module types, Module configuration.)
Solution Information (Solution Version, Installed Fix-Packs, Recommended software, firmware levels.)
Start Order (the order in which hardware and software needs to be started when starting the appliance solution.)
Stop Order (the order in which hardware and software needs to be stopped when bringing down the appliance solution.)
Update Order (the order in which software and firmware needs to be updated when updating the overall appliance solution.)
Appliance Configuration (Overall appliance specific configuration information like timezone, locale, NTP settings and like information.)

Figure 2:
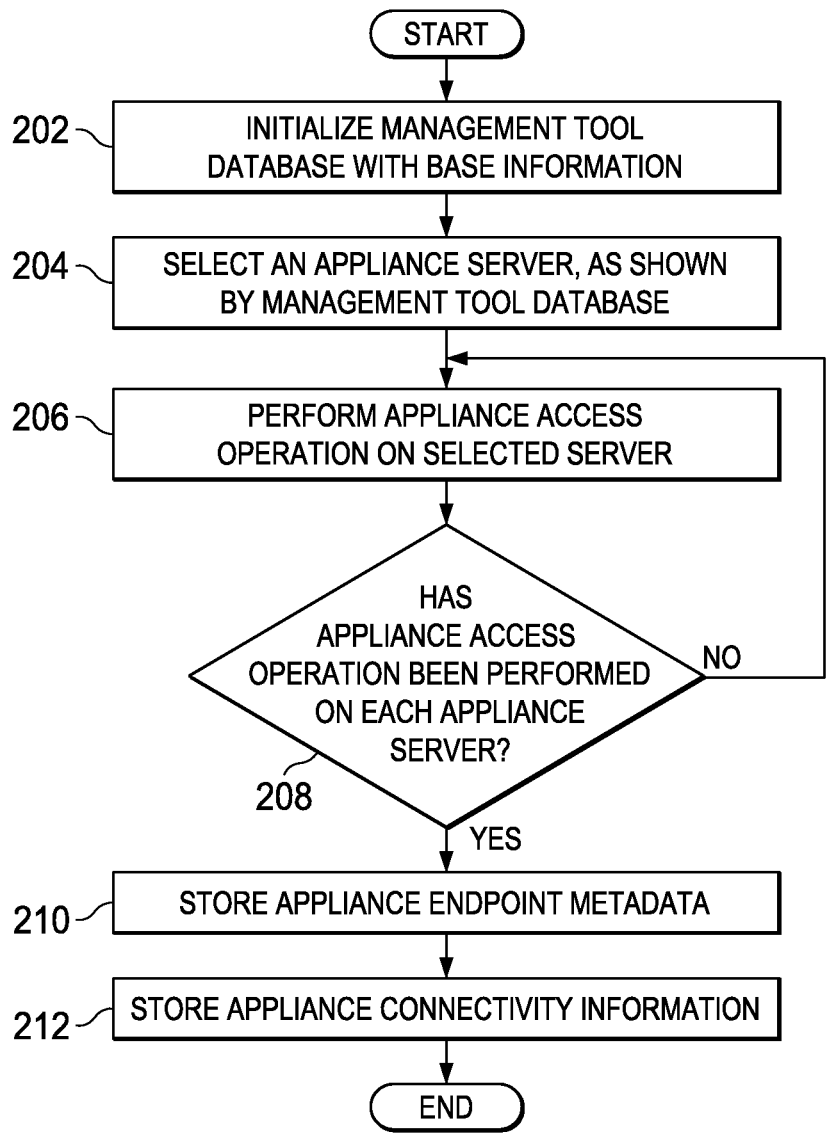
FIG. 2 is a flowchart showing steps of an algorithm that is run by a CTM component, in accordance with an embodiment of the invention.

Referring to FIG. 2, there are shown respective steps of an algorithm that are carried out by CTM 122, in accordance with an embodiment of the invention. At step 202, CTM 122 is operable to initialize management tool 102 with base information pertaining to integrated solution appliance 104, and to a particular solution to be implemented thereon. The base information includes the solution version and start order, stop order and update order metadata. All of the initializing base information is stored on database 126 of management tool 102.

As described above, during deployment of the particular solution, the appliance servers are preloaded with solution level metadata, pertaining to solution topology, control methodology and the like. Accordingly, at step 204 of FIG. 2, one of the servers of the appliance is selected, wherein selection may be made by referring to a list or other information pertaining to the servers that is located in database 126 of management tool 102.

At step 206, an Appliance Access operation is performed on the selected server. The Appliance Access operation is defined to be a CIM query that is performed on an agent running on the server nodes, in order to retrieve the solution level appliance metadata for the selected server. Metadata acquired by the Appliance Access operation pertains to solution topology and also to solution control methodology. The agent returns appliance specific metadata, which is associated with the selected server, in the form of an Appliance Managed Endpoint object described above.

At decision step 208, it is necessary to determine whether or not the Appliance Access operation has been performed on each server included in integrated solution appliance 104. If not, the algorithm returns to step 206 and selects another server for the Appliance Access operation. Otherwise, the algorithm proceeds to step 210.

At step 210, management tool 102 stores retrieved metadata, which comprises endpoint metadata, on database 126. The endpoint metadata pertains to endpoint components, which are generally components that can be managed, such as servers, storage elements and switches.

Following step 210, the algorithm proceeds to step 212, wherein Connected Resources are operated to store connectivity information. The Connected Resources comprises a data structure for storing connectivity information, which pertains to connectivity between hardware elements such as servers, storage elements and switches. Connectivity information is pertinent to stop and start sequences.

The algorithm carried out by CTM 122, as depicted by FIG. 2, is thus able to query the server resources via the Appliance Access operation in order to acquire metadata about solution topology and solution control methodology, e.g. start order, stop order and update order, and also to visualize solution topology. The algorithm further assembles the distributed metadata acquired from various servers, and stores topology and control metadata in a centralized database such as database 126. Metadata about the solution configuration, e.g. users, tunables, and other solution rules, is also acquired and stored at a centralized database.

CTM 122 also provides the following commands:

To initialize appliance:

smcli CTM unit <applianceinit.xml>

To list hardware resources registered with CTM:

smcli CTM lshwres

To list start order, stop order, update order of the appliance:

smcli CTM lsorder <start|stop|update>

Figure 3:
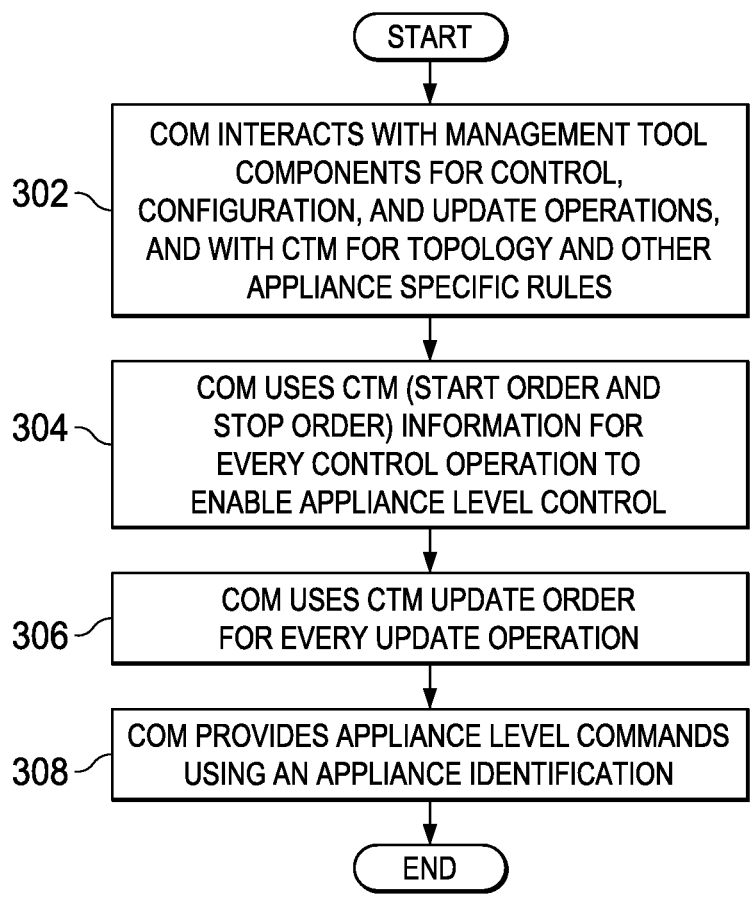
FIG. 3 is a flowchart showing steps of an algorithm that is run by a COM component, in accordance with an embodiment of the invention.

Referring to FIG. 3, there are shown respective steps of an algorithm that are carried out by COM 124, in accordance with an embodiment of the invention. At step 302, COM 124 interacts with certain plug-in components of management tool 102 for every operation such as control (start/stop), configuration and firmware/software update. COM 124 also interacts with CTM 122 to obtain information pertaining to topology and other appliance specific rules.

Step 304 of FIG. 3 indicates that for every control operation, such as start or stop, COM 124 uses the corresponding start order or stop order information, as provided by CTM 122, to enable appliance level control. As an example of this, if a command is issued to start a server belonging to the Data Module, without starting a server belonging to the Admin Module as is required, the command will fail, and the user is informed that it is necessary to start the Admin Module.

Step 306 indicates that for every update operation regarding firmware and software updates, COM 124 will use the update order provided by CTM 122, to ensure that all hardware and software are updated in the correct update order, as required for the specified appliance 104.

At step 308, COM 124 provides appliance level commands, using the appliance identifier or ID. Thus, these commands will have a scope that applies to the entire appliance, and will act on multiple resources of the appliance instead of only a single resource. COM 124 provides the following commands:

To start a single resource:

smceli rpower-n system 1 PowerOn

To start entire appliance:

smceli rpower-com-n appliance0 PowerOn

To stop a single resource:

smcli rpower-n system1 ShutDown

To stop entire appliance:

smcli rpower-com-n appliance0 ShutDown

To update single resource:

smcli installupd-n system1-u updatepackage1

To update entire appliance:

smcli installupd-com-n appliance0-u applianceupdatepackage1

By providing CAM plug-in 120 with the combination of CTM 122 and COM 124 in an embodiment of the invention, such embodiment has the ability to manage a deployed solution within a set of appliance hardware resources as a single logical abstracted entity. For example, the embodiment is able to start or stop the entire solution by issuing a single command. As another example, the embodiment could apply an Operating System fix at the solution level, thereby updating multiple servers that are part of the solution.

Embodiments of the invention as described above also have the ability to utilize the solution metadata to overrule or disallow configuration operations that violate solution level rules on the appliance hardware resources which are part of the solution. As an example, diluting a userID on a database server, when another server running an application is dependent on the userID to access the database instance running on the database server, could create an issue. By disallowing this operation, solution health is maintained.

As additional features for embodiments of the invention, solution metadata could be modeled by extending existing CIM classes for a solution aware management. This will enable standards based systems management and interoperability with existing enterprise systems management standards. Also, dynamic growth and expansion of the deployed solution can be allowed by updating the centralized database having metadata of solution topology.

FIG. 4 depicts a diagram of a data processing system in accordance with an illustrative embodiment. Data processing system 400 is an example of a computer, which may be used to implement one or more components of embodiments of the invention, and in which computer usable program code or instructions implementing the processes may be located for the illustrative embodiments. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multiprocessor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide physical or architectural limitations to the manner in which different embodiments may be implemented. The different illustrative embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for use with an appliance that is under the control of a management tool, wherein the appliance comprises an integrated solution appliance having resources that include at least a console and a plurality of servers, said method comprising the steps of:

providing the management tool with a cluster appliance manager (CAM), managing, with the management tool, the appliance when the appliance is used to implement a solution deployed thereon;

furnishing the CAM with a cluster topology manager (CTM), acquiring, with the cluster topology manager, appliance level information, wherein the acquired information includes specified metadata pertaining to each server of said plurality of servers and wherein CTM initializes the management tool with base information, stored on a database of the management tool, pertaining to the integrated solution appliance and to a particular solution to be implemented thereon, wherein the base information includes a solution version and a start order, a stop order and an update order metadata, wherein the metadata further comprises objects of an appliance managed endpoint and an appliance system; and furnishing the CAM with a cluster operations manager (COM), interacting, by the cluster operations manager with components of the management tool, selectively modifying, with information acquired by the CTM, one or more commands issued by the management tool, which respectively affect operation of the appliance.

2. The method of claim 1, wherein providing the management tool with a cluster appliance manager further comprises:
applying the CAM comprising a plug-in component to the management tool.

3. The method of claim 1, wherein to selectively modify one or more commands issued by the management tool further comprises:
using CTM provided start order or stop order information, respectively by the COM, for a control operation comprising a start or a stop, selectively, to enable appliance level control of the operation.

4. The method of claim 1, wherein to selectively modify one or more commands issued by the management tool further comprises:
using a CTM provided update order provided for an update operation, by the COM to ensure that hardware and software components included in the appliance are updated in a correct update order for the appliance.

5. The method of claim 1, wherein:
the servers of said plurality of servers are each preloaded with solution level metadata, by the CTM, including metadata pertaining to topology and solution methodology control, when the solution is deployed on the appliance.

6. The method of claim 1, wherein:
the CTM queries an agent running on the servers, to retrieve solution level appliance metadata, including metadata pertaining to topology and solution methodology control, from the servers of said plurality of servers.

7. The method of claim 1, wherein the CTM appliance level information acquired as specified solution level metadata, including metadata pertaining to topology and solution methodology control, is placed into a centralized database of the management tool.

8. The method of claim 1, wherein to selectively modify one or more commands issued by the management tool, which respectively affect operation of the appliance further comprises:
using solution level metadata, including metadata pertaining to topology and solution methodology control, acquired by the CTM to overrule or disallow, selectively, a specified configuration operation that pertains to hardware resources of the appliance by the COM.

9. The method of claim 1, wherein to selectively modify one or more commands issued by the management tool, which respectively affect operation of the appliance further comprises:
providing appliance level commands by the COM, wherein one of said appliance level commands impacts multiple resources included in the appliance.

10. The method of claim 1, wherein to selectively modify one or more commands issued by the management tool, which respectively affect operation of the appliance further comprises:
issuing a single command, by the COM, to start or stop the deployed solution, selectively.

11. A non-transitory computer recordable storage medium for use with an appliance that is under the control of a management tool, wherein the appliance comprises an integrated solution appliance having resources that include at least a console and a plurality of servers, having computer executable instructions stored on a non-transitory computer recordable storage medium, said computer executable instructions comprising:
instructions for providing the management tool with a cluster appliance manager (CAM), managing, with the management tool, the appliance when the appliance is used to implement a solution deployed thereon;
instructions for furnishing the CAM with a cluster topology manager (CTM), acquiring, with the cluster topology manager, appliance level information, wherein the acquired information includes specified metadata pertaining to each server of said plurality of servers and wherein CTM initializes the management tool with base information, stored on a database of the management tool, pertaining to the integrated solution appliance and to a particular solution to be implemented thereon, wherein the base information includes a solution version and a start order, a stop order and an update order metadata, wherein the metadata further comprises objects of an appliance managed endpoint and an appliance system; and
instructions for furnishing the CAM with a cluster operations manager (COM), interacting, by the cluster operations manager, with components of the management tool, selectively modifying, with information acquired by the CTM, one or more commands issued by the management tool, which respectively affect operation of the appliance.

12. The non-transitory computer recordable storage medium of claim 11, wherein instructions stored on the non-transitory computer recordable storage medium to selectively modify one or more commands issued by the management tool further comprise:
instructions stored on the non-transitory computer recordable storage medium for a control operation comprising a start or a stop, selectively, directing the COM to use start order or stop order information, respectively, provided by the CTM to enable appliance level control of the operation.

13. The non-transitory computer recordable storage medium of claim 11, wherein instructions stored on the non-transitory computer recordable storage medium to selectively modify one or more commands issued by the management tool further comprise:
instructions stored on the non-transitory computer recordable storage medium for an update operation, directing the COM to use an update order provided by the CTM to ensure that hardware and software components included in the appliance are updated in a correct update order for the appliance.

14. The non-transitory computer recordable storage medium of claim 11, wherein instructions stored on the non-transitory computer recordable storage medium further comprise:
instructions stored on the non-transitory computer recordable storage medium for the CTM to acquire specified solution level metadata, including metadata pertaining to topology and solution methodology control, which is placed into a centralized database of the management tool.

15. The non-transitory computer recordable storage medium of claim 11, wherein instructions stored on the non-transitory computer recordable storage medium to selectively modify one or more commands issued by the management tool further comprise:

instructions stored on the non-transitory computer recordable storage medium to configure the COM to provide appliance level commands, wherein one of said appliance level commands impacts multiple resources included in the appliance.

16. Apparatus for use with an appliance that is under the control of a management tool, wherein the appliance comprises an integrated solution appliance having resources that include at least a console and a plurality of servers, said apparatus comprising:

a memory;

a processor coupled to the memory configured to execute programmed instructions stored in the memory comprising:

a cluster appliance manager (CAM), which is associated with the management tool, and for managing the appliance when the appliance is used to implement a solution deployed thereon;

a cluster topology manager (CTM) furnished to the CAM for use in acquiring appliance level information, wherein the acquired information includes specified metadata pertaining to each server of said plurality of servers and wherein CTM initializes the management tool with base information, stored on a database of the management tool, pertaining to the integrated solution appliance and to a particular solution to be implemented thereon, wherein the base information includes a solution version and a start order, a stop order and an update order metadata, wherein the metadata further comprises objects of an appliance managed endpoint and an appliance system; and a cluster operations manager (COM) furnished to the CAM, to interact with components of the management tool, using information acquired by the CTM to selectively modify one or more commands issued by the management tool, which respectively affect operation of the appliance.

17. The apparatus of claim 16, wherein associating the CAM with the management tool further comprises:

applying the CAM comprising a plug-in component to the management tool.

18. The apparatus of claim 16, wherein:

the CTM queries an agent running on the servers, in order to retrieve solution level appliance metadata, including metadata pertaining to topology and solution methodology control, from the servers of said plurality of servers.

19. The apparatus of claim 16, wherein the CTM appliance level information acquired as specified solution level metadata, including metadata pertaining to topology and solution methodology control, is placed into a centralized database of the management tool.

20. The apparatus of claim 16, wherein to selectively modify one or more commands issued by the management tool, which respectively affect operation of the appliance further comprises:

providing appliance level commands by the COM, wherein one of said appliance level commands impacts multiple resources included in the appliance.

* * * * *